United States Patent
Kline et al.

(10) Patent No.: US 8,261,354 B2
(45) Date of Patent: Sep. 4, 2012

(54) SYSTEM, METHOD AND PROGRAM PRODUCT FOR DYNAMICALLY PERFORMING AN AUDIT AND SECURITY COMPLIANCE VALIDATION IN AN OPERATING ENVIRONMENT

(75) Inventors: Christopher N. Kline, Firestone, CO (US); Linwood E. Loving, Mechanicsville, VA (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 12/212,172

(22) Filed: Sep. 17, 2008

(65) Prior Publication Data

US 2010/0071066 A1   Mar. 18, 2010

(51) Int. Cl.
  *H04L 29/14* (2006.01)
(52) U.S. Cl. ......................................................... 726/25
(58) Field of Classification Search ........................ None
  See application file for complete search history.

(56) References Cited

U.S. PATENT DOCUMENTS

| | | | |
|---|---|---|---|
| 6,941,361 B1 * | 9/2005 | Fink et al. ..................... | 709/223 |
| 6,980,927 B2 * | 12/2005 | Tracy et al. ................... | 702/181 |
| 7,350,234 B2 | 3/2008 | Goseva-Popstojanova et al. | |
| 7,668,947 B2 * | 2/2010 | Hutchinson et al. .......... | 709/223 |
| 7,712,138 B2 * | 5/2010 | Zobel et al. .................... | 726/25 |
| 8,019,857 B2 * | 9/2011 | Nguyen ......................... | 709/224 |
| 2002/0069035 A1 | 6/2002 | Tracy et al. | |
| 2006/0156407 A1 | 7/2006 | Cummins | |
| 2007/0283441 A1 | 12/2007 | Cole et al. | |

OTHER PUBLICATIONS

Mell et al., "Creating a Patch and Vulnerability Management Program", Nov. 2005, NIST, pp. 2-1-4-7.*
"Nessus 3.0—Advanced User Guide", Feb. 2007, Tenable Network Security.*
"Tenable Network Security", Sep. 2007, Tenable Network Security.*
Fullerton, "Vulnerability Assessments with Nessus 3", 2007.*

* cited by examiner

*Primary Examiner* — Minh Dinh
(74) *Attorney, Agent, or Firm* — Arthur J. Samodovitz; Silvy Anna Murphy

(57) ABSTRACT

A system, method and program product for dynamically performing an audit and security compliance validation. The method includes providing a tool for performing a compliance check of installed computer applications running on a system, the tool including a first set and a second set of plug-ins. Further, the method includes scanning the system, using plug-ins selected from the first set to obtain a current inventory of applications currently installed on the system and selecting plug-ins from the second set to be run on the system in response to the current inventory of applications obtained, and automatically running the plug-ins selected from the second set for performing the compliance check on the system in response to a scheduling criteria identified for the system, where the second set of plug-ins perform the compliance check for only the applications currently installed on the system.

25 Claims, 11 Drawing Sheets

SYSTEM, METHOD AND PROGRAM PRODUCT FOR DYNAMICALLY PERFORMING AN AUDIT AND SECURITY COMPLIANCE VALIDATION IN AN OPERATING ENVIRONMENT

FIELD OF THE INVENTION

The present invention relates to a computer systems and software, and more specifically to a technique for dynamically automating the performance of an audit and security compliance validation in a given environment.

BACKGROUND OF THE INVENTION

In today's computing environment, computer system components change dynamically via software distribution systems, such as, loading and unloading of applets via the Internet and other sources, and virtualization of resources, where processing capabilities are moved around based on available computer resources. Given that system environments can change often, system administrators may have a difficult time performing any required security and audit compliance validation and correction manually, especially with the level of accuracy required. As such, there is a need for administrators to effectively identify and analyze changes to a system for effectively performing any required security and audit compliance checks.

SUMMARY OF THE INVENTION

The present invention resides in a system, method and program product for dynamically performing an audit and security compliance validation of a computer system or target system, using a program or tool, in accordance with an embodiment of the invention. The method includes providing a tool for performing an audit and security compliance validation of one or more installed computer applications running on a computer system in an operating environment, the tool including a first set of plug-ins and a second set of plug-ins. Further, the method includes scanning the computer system, using one or more plug-ins from the first set of plug-ins of the tool, to obtain a current inventory of computer applications currently installed on the computer system in the operating environment, selecting one or more plug-ins from the second set of plug-ins of the tool to be run on the computer system in response to the current inventory of the computer applications obtained for the computer system in the operating environment, and automatically running the one or more plug-ins selected from the second set of plug-ins of the tool for performing the audit and security compliance validation on the computer system in response to a scheduling criteria identified for the computer system, wherein the one or more plug-ins selected from the second set of plug-ins perform the audit and security compliance validation for only the computer applications currently installed on the computer system in the operating environment and wherein the operating environment includes at least one of: a development environment, a test environment, a quality and assurance environment, a production environment and a laboratory environment. In an embodiment, the method further includes securely transmitting, to a repository, results of the audit and security compliance validation performed on the computer system in the operating environment. In an embodiment, the scanning step further includes identifying one or more scheduling criteria for triggering automatic performance of the tool on the computer system in the operating environment, wherein the one or more scheduling criteria includes at least one of: operating mode, operating environment or server platform. In an embodiment, the identifying step further includes configuring, in a configuration file, the one or more scheduling criteria for triggering the automatic performance of the tool on the computer system, wherein occurrence of the one or more scheduling criteria triggers the automatic performance of the one or more plug-ins selected from the first set of plug-ins and the second set of plug-ins on the computer system. In an embodiment, the selecting step further includes reading, by the tool, the configuration file for determining the one or more plug-ins from the second set of plug-ins to be run on the computer system in the operating environment. In an embodiment, the securely transmitting step further includes writing the results of the audit and security compliance validation performed to one or more machine readable report files stored in the repository.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
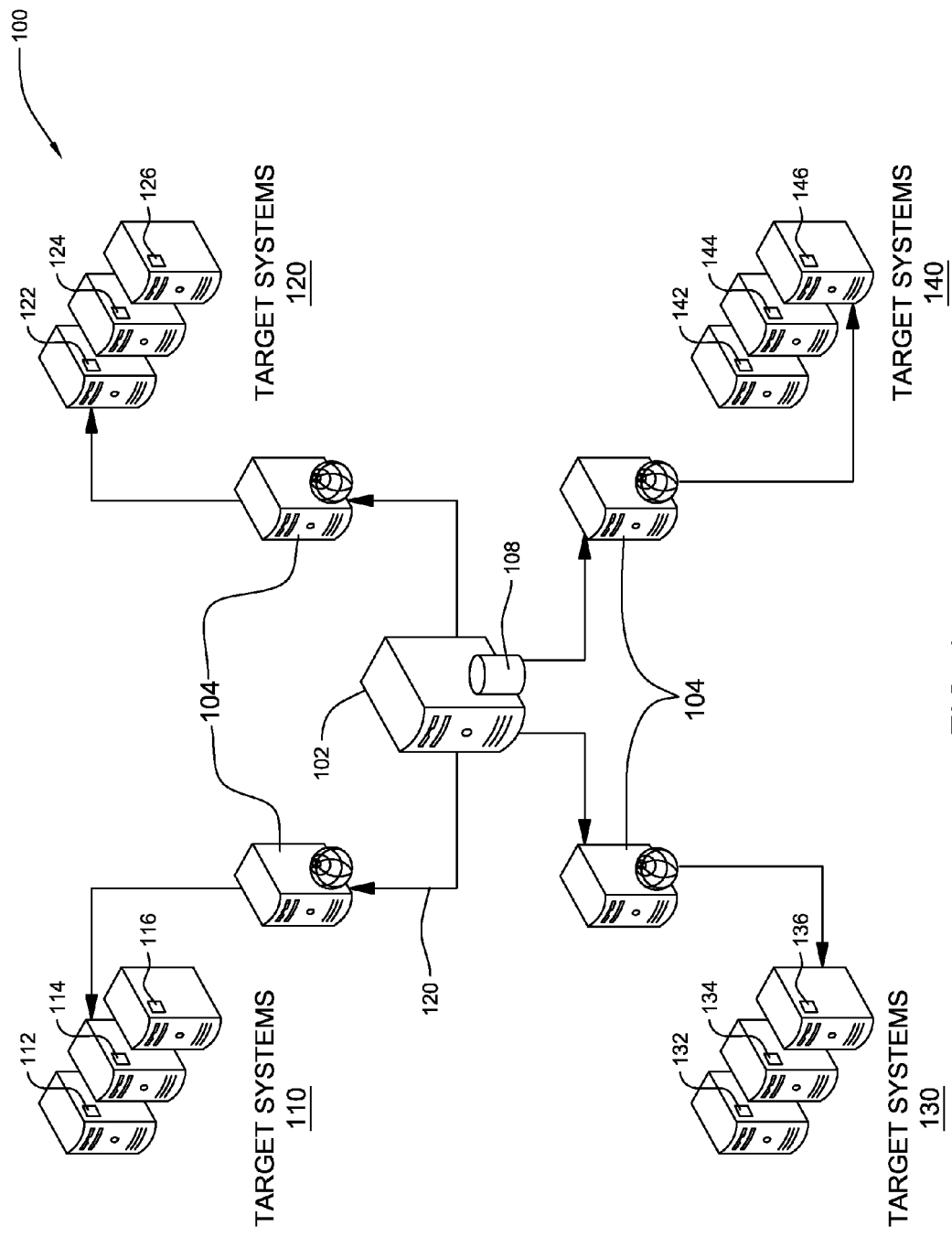
FIG. 1 is a schematic diagram illustrating one embodiment of a system for dynamically performing an audit and security compliance validation on a target system, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a system for dynamically performing an audit and security compliance validation on a computer system or target system, in accordance with an embodiment of the invention. Reference is now made to FIG. 1, reference numeral 100, which schematically illustrates an embodiment of a system for dynamically performing an audit and security compliance validation on a computer system, in accordance with an embodiment of the invention. As shown in FIG. 1, the system infrastructure 100 includes hundreds or thousands of computers or servers that are remotely connected to each other via a network connection 120. The system infrastructure 100 includes a central computer system 102 that is connected on a network to other remote computers or servers in the infrastructure via the network connection 120. In an embodiment, the central computer system 102 is a repository server or a database server 102 that includes a central repository or database 108. Further, in an embodiment, the central computer system 102 is remotely connected via the network connection 120 to a middle tier system 104 comprising of one or more middle tier servers or computers 104. In an embodiment, the middle tier servers 104 comprise account servers or management servers. In an embodiment, the purpose of the middle tier servers or computers 104 is to facilitate network security, for instance, for firewalls, etc. and to limit the total number of individual corrections made to the central repository server 102. It is understood by one skilled in the art that the infrastructure 100 may include multiple middle tier of servers and computers 104 as needed by specific network topology in order to connect indirectly the target systems 110, 120, 130 and 140 to the central repository server 102. Further, in an embodiment, the central computer system 102 is connected via the middle tier servers 104 to each of the target systems 110, 120, 130 and 140. It is understood that in an embodiment the system infrastructure 100 may exclude the middle tier servers 104 and that the central computer system 102 may instead connect directly to each of the remote target systems 110, 120, 130 and 140. Further, in an embodiment, an audit and security compliance validation tool is deployed on each of the target systems 110, 120, 130 and 140 for dynamically performing an audit and security compliance validation on one or more of the respective target systems to ensure that the one or more target systems 110, 120, 130 and 140 are in compliance based on certain requirements for a target system. In particular, audit and security compliance validation programs 112, 114 and 116 are installed in respective target systems 110, whereas, audit and security compliance validation programs 122, 124 and 126 are installed in respective target systems 120. Similarly, audit and security compliance validation programs 132, 134 and 136 are installed in respective target systems 130, whereas, audit and security compliance validation programs 142, 144 and 146 are installed in respective target systems 140.

Figure 2:
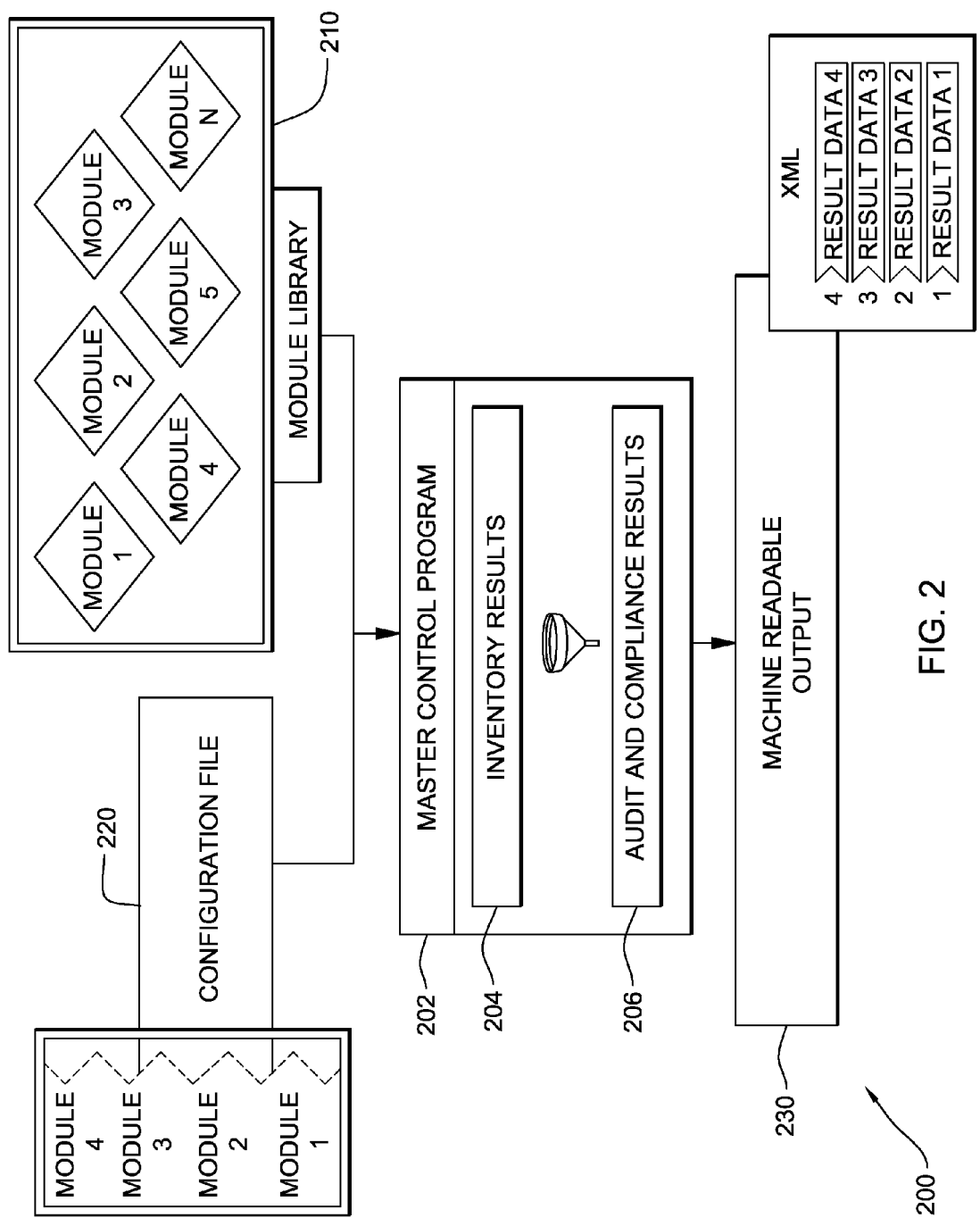
FIG. 2 is a schematic diagram illustrating another embodiment of a system for dynamically performing an audit and security compliance validation on a target system, in accordance with an embodiment of the present invention.

Reference is now made to FIG. 2, reference numeral 200, which schematically illustrates an embodiment of a target system (of the plurality of target systems 110, 120, 130 and 140 shown in FIG. 1) for dynamically performing an audit and security compliance validation on a computer system or target system, in accordance with an embodiment of the invention. As shown in FIG. 2, the audit and security compliance validation program or tool 202 (also referred to herein as the "master control program" or "master program" is deployed on the target system 200. In an embodiment, the audit and security compliance validation program comprises a heuristic program that reads a configuration file 220 created and stored on the system 200 to determine which of one or more inventory plug-ins or modules stored in the module library 210 should be executed first. In an embodiment, the inventory plug-ins or modules are executed first to determine the one or more computer applications or products that are running on the target system 200. In an embodiment, the audit and security compliance validation program executes select inventory plug-ins or modules for determining applications or products running in the middleware layer or application layer of a respective target system as opposed to the operating system layer of a respective target system. In an embodiment, the configuration file 220 contains all the information necessary for each system to determine which plug-ins or modules need to be run at any given time, based on multiple criteria. The configuration file 220 also determines how an output is handled. For instance, the configuration file 220 may contain one or more scheduling criteria, such as, operating modes or execution rules or runtime profiles, operating environment, and server platform, as discussed further herein below. In an embodiment, the configuration file 220 contains an operating mode or execution rule or runtime profile and one or more corresponding plug-ins or modules that should be executed depending on which operating mode or runtime profile is active. The creation of execution rules or operating modes, allows the ability to establish processing intervals, which can be used to correlate specific plug-ins to be executed based on a given point-in-time. Additionally, the scheduling criteria may include a type of operating environment for a given system as well as any related operating environment criteria for determining the type of operating environment that pertains to a system for which the audit and security compliance validation is being performed. For instance, an operating mode may be defined, such that, the audit and security compliance validation program or tool will execute each week day of every month. Alternatively, an operating mode may be defined, such that, the audit and security compliance validation program or tool will execute only once a week, etc. In addition, the audit and security compliance validation program or tool may be configured, such that, the check will only be performed for certain operating environments, such as, only if the system is a production environment or only if a system is a test environment, etc. Moreover, the audit and security compliance validation program could be configured to run based on a determination made by using a heuristics program running within the audit and security compliance validation program to programmatically determine the type of system on which the audit and security compliance is to be run. For example, operating environment filters or criteria may be used to run the audit and security compliance validation program or tool on a system that matches a given system name provided or matches a pattern string criteria provided that corresponds to a particular operating environment in which the system operates by comparing specific hostnames, IP address, etc. For example, the operating environment criteria may specify "system1", where "system1" is defined as a production server or the operating environment criteria may specify "server1D", where the "D" in "server1D" represents a development server. It will be understood by one skilled in the art that other methods may be utilized by the heuristics program to dynamically self-diagnose applicable operating environments. Further, as shown in FIG. 2, in response to the inventory results 204 obtained from the execution of the inventory plug-ins or modules 210, the audit and security compliance validation program or tool reads the configuration file 220 to determine which of the health-check plug-ins or modules stored within the module library 210 should be executed for performing the audit and security compliance validation on the respective target system. In an embodiment, the health-check plug-ins or modules selected from the module library 210 are based on the applications determined to be running or installed on the target system as learned from the inventory results 204 obtained from the inventory plug-ins executed on the target system. As such, a health-check plug-in or module is only executed for an application determined to be installed or running on the target system. In other words, if a particular application is not installed or found running on a system, then the corresponding health-check plug-in or module for determining compliance is not executed on the system. In an embodiment, if several health-check plug-ins or modules are selected, then the audit and security compliance validation tool or program executes the health-check plug-ins or modules in a sequential order, according to a queue. Further, the audit and security compliance validation program or tool writes the inventory results 204 and the health-check results or audit and compliance check results 206 to one or more machine readable output files 230 for automated database loading and reporting of the results of the audit and security compliance validation performed on a computer system. In an embodiment, the machine readable output files 230 comprise XML (Extensible Markup Language) files.

Figure 3:
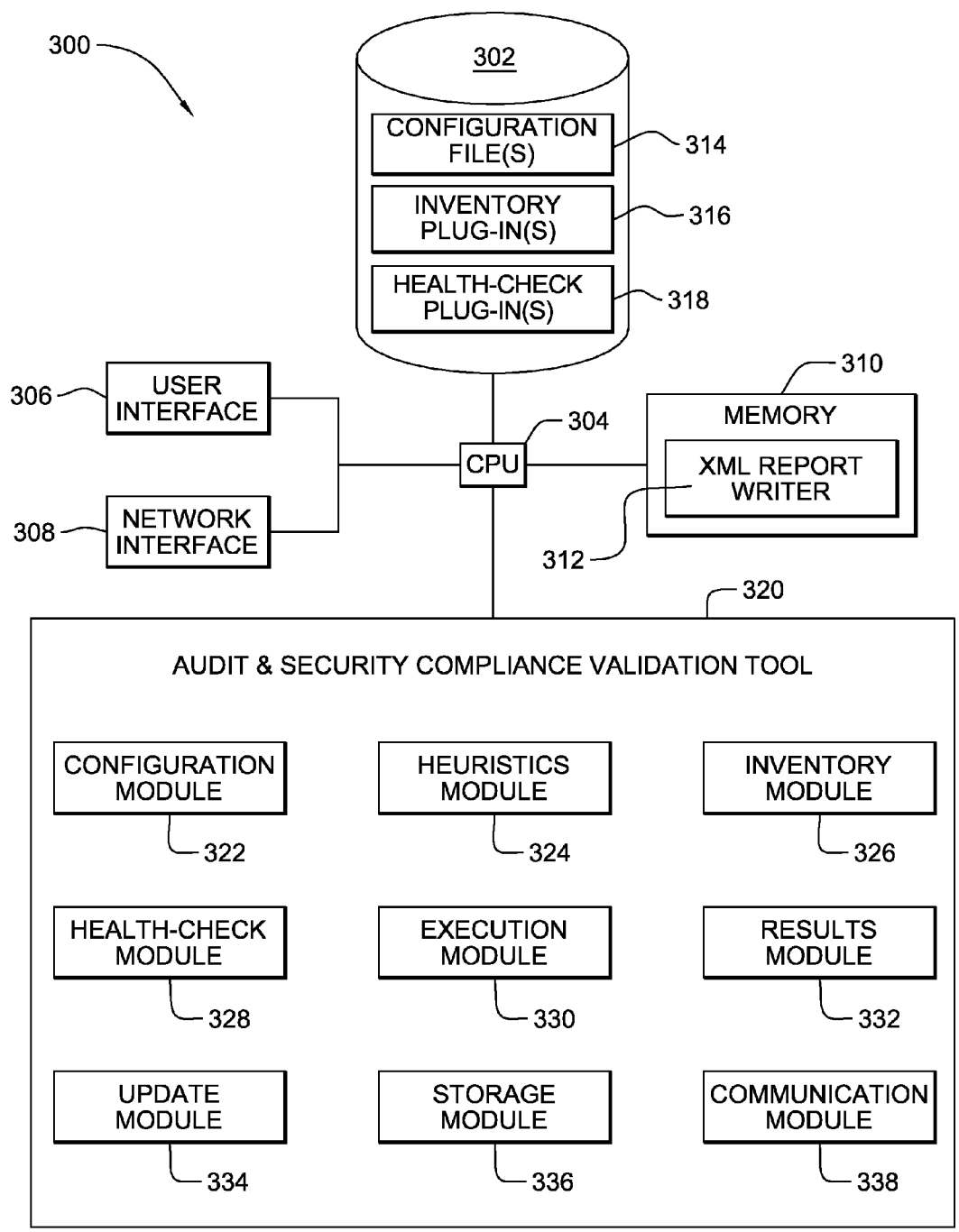
FIG. 3 depicts an embodiment of a computer system having deployed thereon an audit and security compliance validation tool for dynamically performing an audit and security compliance on a target system, in accordance with an embodiment of the present invention.

Reference is not made to FIG. 3, which depicts an embodiment of a computer system having deployed thereon an audit and security compliance validation tool for dynamically performing an audit and security compliance of the target system, in accordance with an embodiment of the present invention. Turning to FIG. 3, reference numeral 300 depicts a schematic block system diagram illustrating one embodiment of a computer system or target system 300 that has deployed thereon an audit and security compliance validation tool or program 320 for dynamically performing an audit and security compliance of the target system, in accordance with an embodiment of the present invention. Preferably, the system 300 is a computer system or target system that includes a central processing unit (CPU) 504, a local storage device 302, a user interface 306, a network interface 308, and a memory 310. The CPU 304 is configured generally to execute operations within the system 300, such as, the audit and security compliance validation tool or program 320. The user interface 306, in one embodiment, is configured to allow a user to interact with the target system 300, including allowing input of data and commands from a user and communicating output data to the user. The network interface 308 is configured, in one embodiment, to facilitate network communications of the system 300 over a communications channel of a network 120 (shown in FIG. 1). In an embodiment, the local memory 310 is configured to store one or more applications or programs, such as the XML Report Writer application 312 for reporting the results of the audit and security compliance validation performed on the target system. Further, in an embodiment, the configuration file(s) 312 generated using the configuration data obtained from the target system is stored within a storage system 302. Alternatively, the configuration file(s) 312 may be stored in memory 310 or in a separate storage.

In one embodiment, as shown in FIG. 3, the audit and security compliance validation program or tool 320 which runs on the target system 300 comprises a logic unit that contains a plurality of modules configured to functionally execute the necessary steps of dynamically performing an audit and security compliance of the target system, in accordance with an embodiment of the present invention. In particular, the audit and security compliance validation program or tool 320 includes a configuration module 322, a heuristics module 324, an inventory module 326, a health-check module 328, an execution module 330, a results module 332, an update module 334, a storage module 336 and a communication module 332. In an embodiment, the configuration module 322 within the audit and security compliance validation program or tool 320 is configured to store configuration data for the target system 300, such as, operating modes or execution rules to be applied, operating environments (for instance, test, development, production, etc.), platform information, such as type and version, and required software, including package and version data. In an embodiment, the configuration data for the target system 300 is stored in one or more configuration files 314 in local storage 302 based on configuration data provided to the configuration module 322. It is understood that the configuration files 314 may be stored in memory 310. In an embodiment, the heuristics module 324 is configured to provide heuristic algorithms to be able to dynamically self-diagnose applicable operating environments for dynamically performing an audit and security compliance validation of a system. In an embodiment, the requirements module 324 sets forth execution requirements for a system. In an embodiment, the inventory module 326 is configured to provide a library of one or more inventory plug-ins available for execution on the target system for determining a current inventory of applications or products installed on the system. In an embodiment, the health-check module 328 is configured to provide a library of one or more health-check plug-ins available for execution on the target system for determining security compliance of the system. In an embodiment, the execution module 330 is configured to queue the one or more modules to be executed on the target system. In an embodiment, the results module 332 is configured to display results of the execution of the inventory plug-ins and the health-check plug-ins executed on the target system. In an embodiment, the update module 334 is configured to update any of the other modules within the audit and security compliance validation tool 320. In an embodiment, the storage module 336 is configured to write to or store in a results file or report file machine readable output of the results of the plug-ins executed. In an embodiment, the communication module 338 is configured to permit communication between the various modules of the audit and security compliance validation tool 320, the memory 310, and with external computer systems connected to the target system over a network.

Figure 4:
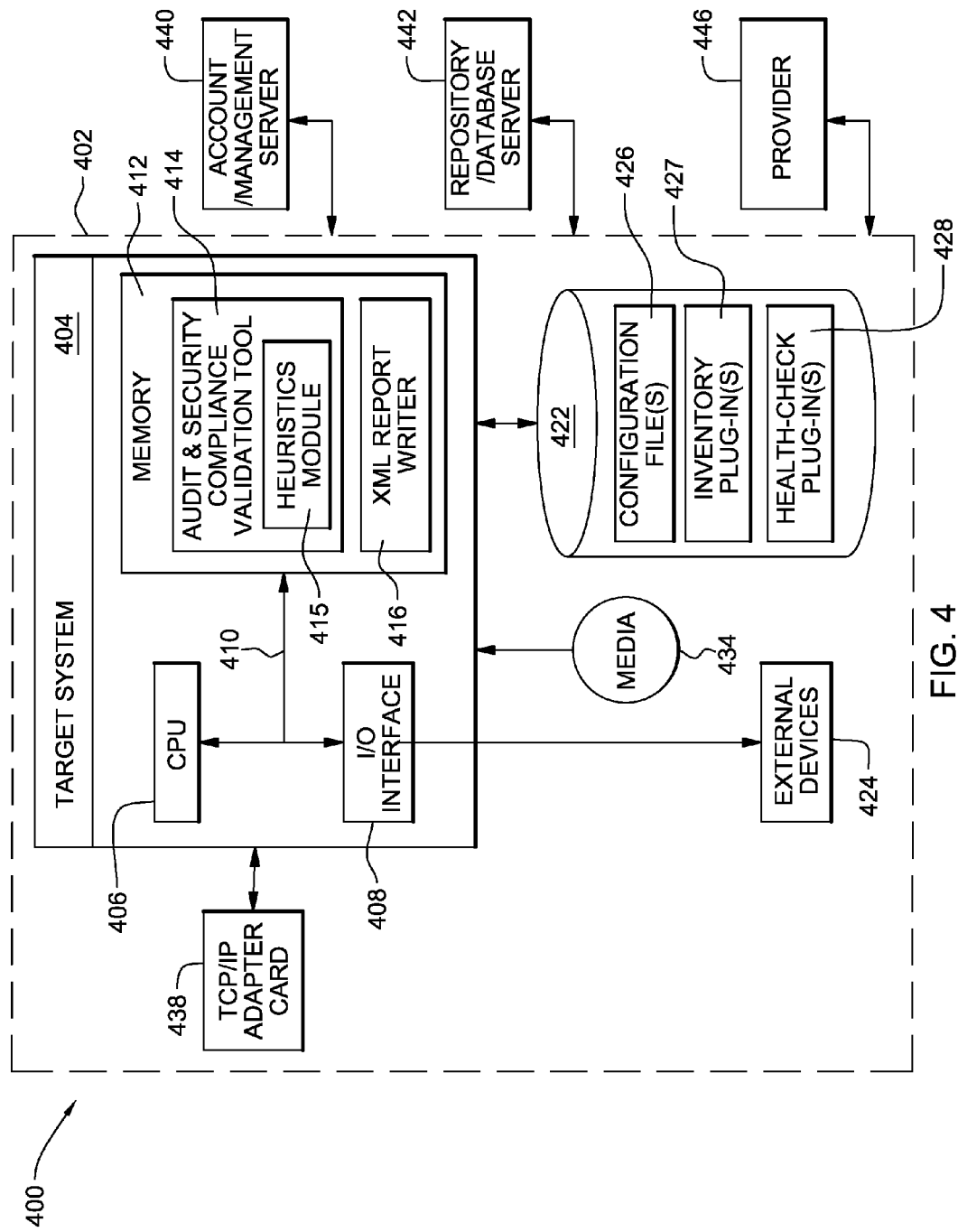
FIG. 4 depicts a computer infrastructure for dynamically performing an audit and security compliance validation on a target system, in accordance with an embodiment of the present invention.

Referring now to FIG. 4, there is illustrated a system 400 within an infrastructure 402 that includes a target system or computer system 404 that has deployed thereon a computer program product, namely, the audit and security compliance validation program or tool 414, which implements the invention for dynamically performing an audit and security compliance validation on the target system 404, in accordance with an embodiment of the present invention. The computer program product comprises a computer readable or computer-usable storage medium, which provides program code namely, the audit and security compliance validation program or tool 414, for use by or in connection with a target system or computer system or any instruction execution system. The audit and security compliance validation program or tool 414 can be (a) loaded onto each of the target system 404, target systems 1 (reference numeral 430) through target system N (reference numeral 432, respectively) from a computer readable medium or media (reference numeral 434, 435 through 436, respectively), such as, a magnetic tape or disk, optical media, DVD, memory stick, semiconductor memory, etc. or (b) downloaded from the server via a TCP/IP adapter card (reference numerals 838) installed on the respective systems or servers. As depicted in FIG. 4, system 400 includes a computer infrastructure 402, which is intended to represent any type of computer architecture that is maintained in a secure environment (i.e., for which access control is enforced). Further, as shown, infrastructure 402 includes a computer or target system 404 that typically represents an application server or system 404 or the like that includes an audit and security compliance validation tool 414. It should be understood, however, that although not shown, other hardware and software components (e.g., additional computer systems, routers, firewalls, etc.) could be included in infrastructure 402.

In general, the target system 404 is connected via a network to infrastructure 402. The target system 404 includes the audit and security compliance validation tool or agent 414 that is run on the target system 404 for dynamically performing the audit and security compliance validation of the system 404. Further, as shown in FIG. 4, the target system 404 can communicate with management or account server 440 and/or a repository or database server 442, as discussed herein above with respect to FIG. 1. For instance, the account server 440 can interface with infrastructure 402 in order to update or configure the audit and security compliance validation tool for different accounts. Similarly, the repository server 442 can receive results of the audit and security compliance validation performed on the target system 404 to determine whether or not the target system 404 is in compliance with respect to the inventory of applications running on the target system 404 and/or in compliance with the audit and security compliance validation requirements. Similarly, although not shown, each of the other target systems connected to the central repository server (as shown in FIG. 1) comprises respective infrastructures similar to infrastructure 402 utilized by target system 404 for communicating with the central repository server. It should be understood that under the present invention, infrastructure 402 could be owned and/or operated by a party such as provider 446, or by an independent entity. Regardless, use of infrastructure 402 and the teachings described herein could be offered to the parties on a subscription or fee-basis.

The target server 404 is shown to include a CPU (hereinafter "processing unit 406"), a memory 412, a bus 410, and input/output (I/O) interfaces 408. Further, the server 404 is shown in communication with external I/O devices/resources 424 and storage system 422. In general, processing unit 406 executes computer program code stored in memory 412, such as the audit and security compliance validation tool 414, using the data stored in the configuration file 426. In an embodiment, the audit and security compliance validation program or tool 414 includes a heuristics program or module 415, which is configured to provide heuristic algorithms for dynamically self-diagnosing or determining applicable operating environments on which to dynamically perform an audit and security compliance validation of a system. Further, processing unit 406 executes the XML Report Writer computer program code 416. While executing the audit and security compliance validation tool or program 414 and/or the XML Report Writer code 416, the processing unit 406 can read and/or write data, to/from memory 412, storage system 422, and/or I/O interfaces 408, such as, the configuration file 426. Alternatively, the audit and security compliance validation tool 414 stores the configuration file 426 in memory 412. Bus 410 provides a communication link between each of the components in computer system 400, such that information can be communicated within the infrastructure 402. External devices 424 can comprise any devices (e.g., keyboard, pointing device, display, etc.) that enable a user to interact with computer system 400 and/or any devices (e.g., network card, modem, etc.) that enable target system 404 to communicate with one or more other computing devices, such as, servers 440 and/or 442.

Computer infrastructure 402 is only illustrative of various types of computer infrastructures for implementing the invention. For example, in one embodiment, computer infrastructure 402 may comprise two or more server groups or clusters (similar to server group A) that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 422 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc.) not shown in FIG. 4 can be included in computer system 400.

Storage system 422 can be any type of system (e.g., a database) capable of providing storage for information under the present invention. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

Figure 5:
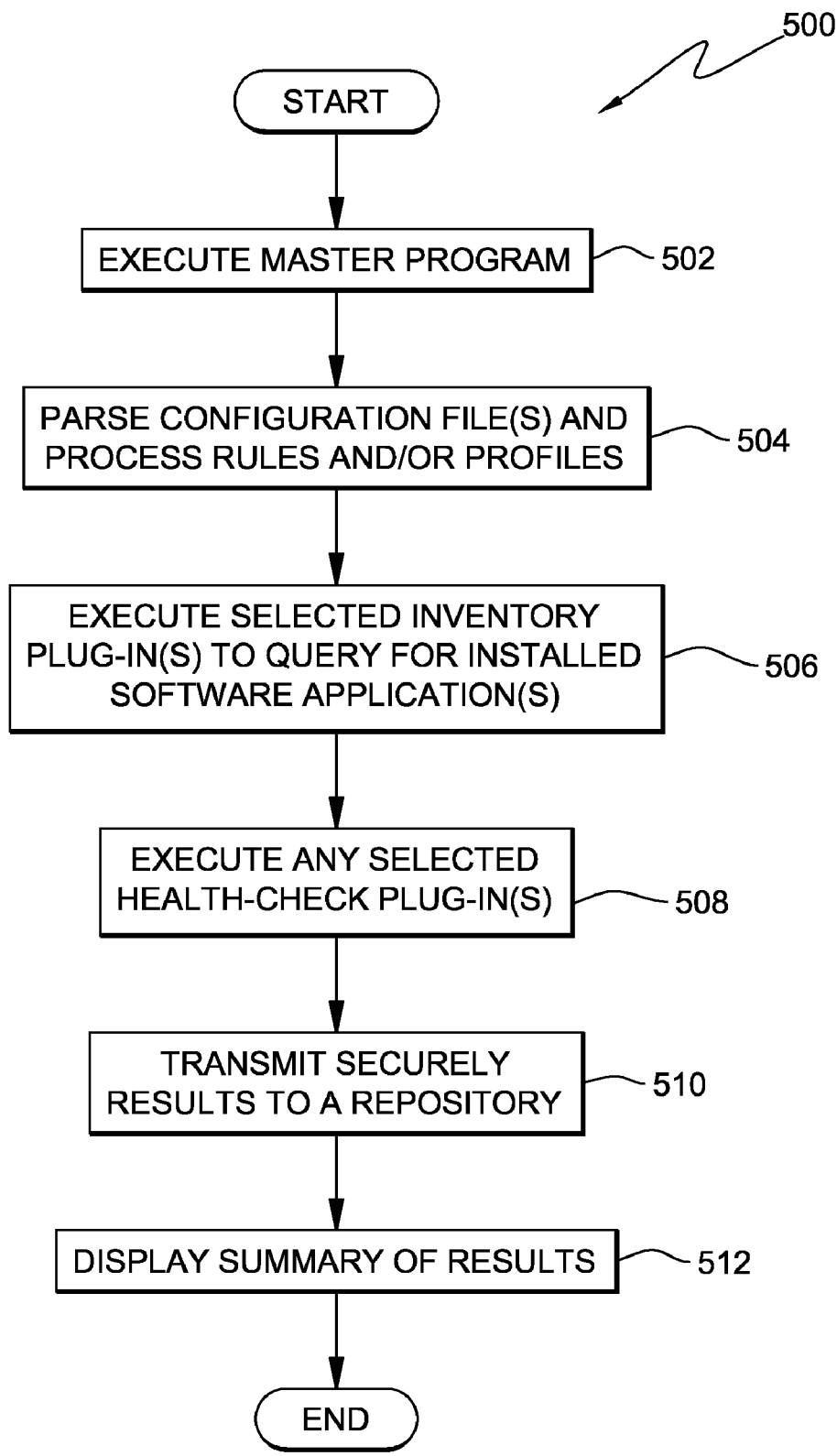
FIG. 5 depicts a flowchart outlining the overall steps performed by an audit and security compliance validation tool for dynamically performing an audit and security compliance validation on a target system, in accordance with an embodiment of the present invention.

In another embodiment, the invention provides a method or process for dynamically performing an audit and security compliance validation on a computer system or target system, in accordance with an embodiment of the invention. Reference is now made to FIGS. 5 through 11, which together depict a method or process for dynamically performing an audit and security compliance validation on a target system, using the audit and security compliance validation program or tool loaded on the target system, in accordance with an embodiment of the invention. Turning to FIG. 5, reference numeral 500, depicts a flowchart outlining the overall steps performed by an audit and security compliance validation tool for dynamically performing an audit and security compliance validation, in accordance with an embodiment of the present invention. In step 502, the audit and security compliance validation tool or master program is executed on a target system. In an embodiment, the audit and security compliance validation program or tool is executed via a cron job or a scheduler or controller. The audit and security compliance validation tool parses in step 504 one or more configuration file(s) and processes rules and/or execution rules or runtime profiles contained therein, which is further discussed herein below with respect to FIGS. 6 and 7. Further, the audit and security compliance validation program or tool executes one or more selected inventory plug-in(s) in step 506 based on configuration data contained in the one or more configuration file(s) in order to query for software applications or products currently installed on the target system, which is further discussed herein below with respect to FIG. 8. Further, in step 508, the audit and security compliance validation program or tool executes one or more selected health-check plug-in(s) based on the results of the execution of the inventory plug-ins, which is further discussed herein below with respect to FIG. 9. The audit and security compliance validation program or tool transmits in a secure manner, in step 510, the results of the inventory and the health-check plug-ins that were executed on the target system to the central repository server 102 (as shown in FIG. 1), which is further discussed herein below with respect to FIG. 10. Further, the audit and security compliance validation program or tool displays or prints or stores a summary of the results of the execution of the inventory and health-check plug-in(s) to a user, which is further discussed herein below with respect to FIG. 11, ending the process.

Figure 6:
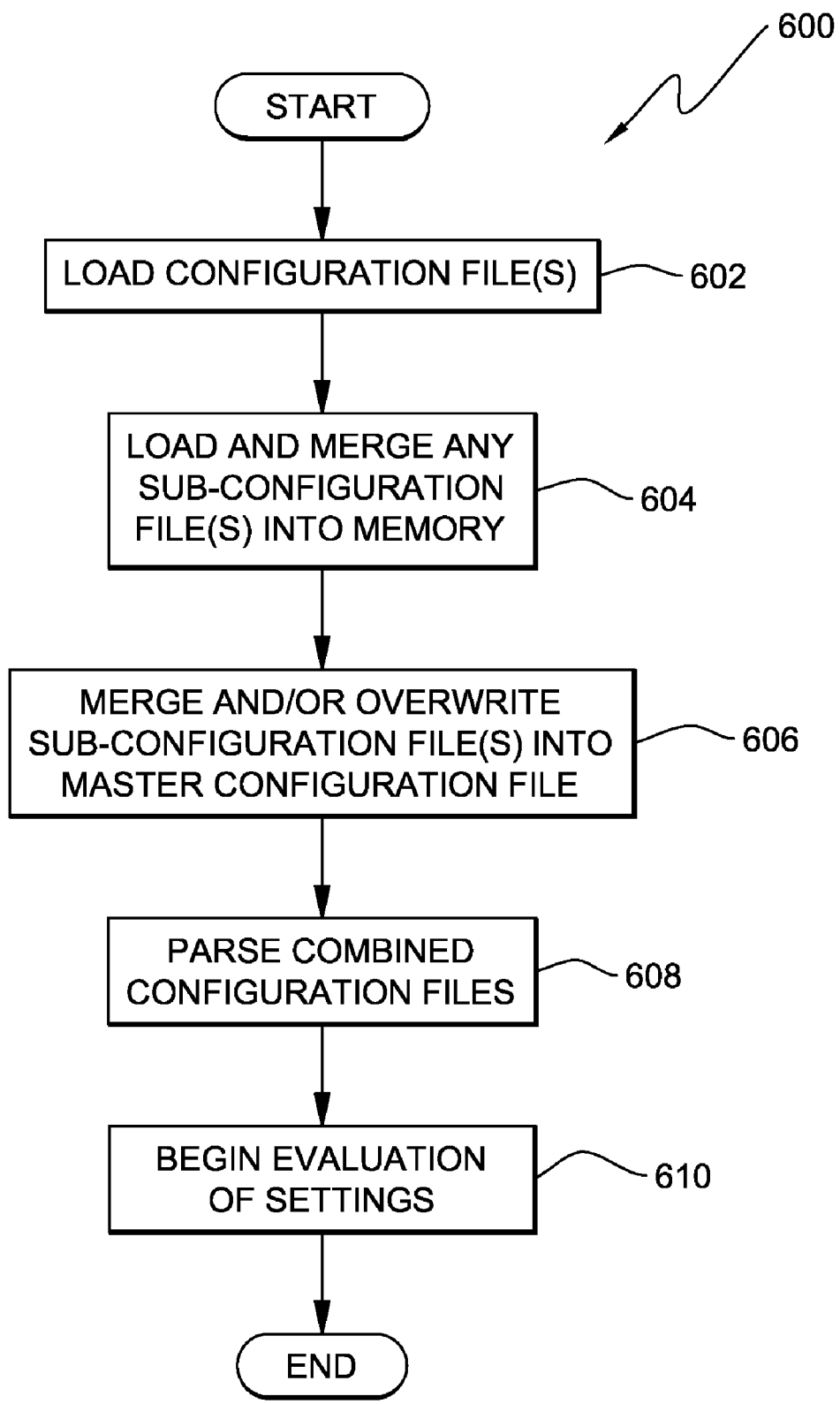
FIG. 6 depicts a flowchart outlining one embodiment of the steps performed by an audit and security compliance validation tool for dynamically performing an audit and security compliance validation on a target system, in accordance with an embodiment of the present invention.
Figure 7:
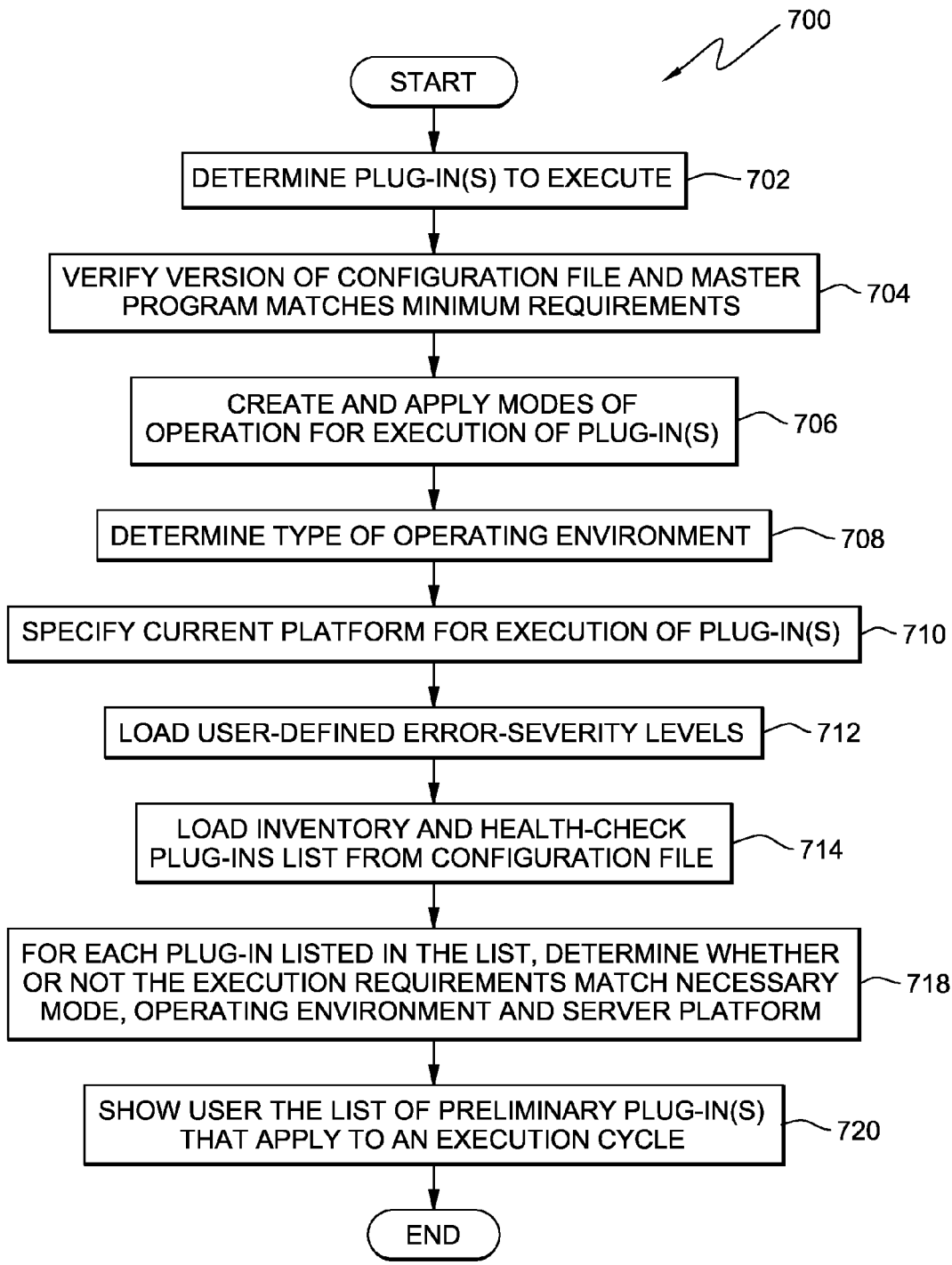
FIG. 7 depicts a flowchart outlining one embodiment of the steps performed by an audit and security compliance validation tool for dynamically performing an audit and security compliance validation on a target system, in accordance with an embodiment of the present invention.

Reference is now made to FIGS. 6 and 7, reference numeral 600 and 700, respectively, which depict respective flowcharts outlining respective embodiments of the steps performed by an audit and security compliance validation tool for dynamically performing an audit and security compliance validation, in accordance with an embodiment of the present invention. In particular, FIGS. 6 and 7 outline the steps performed by the audit and security compliance validation program or tool in step 504 of FIG. 5. Turning to FIG. 6, reference numeral 600, outlines the steps performed by the audit and security compliance validation program or tool of parsing one or more configuration file(s). In step 602, the audit and security compliance validation program or tool loads the one or more configuration file(s) into memory. Further, in step 604, the audit and security compliance validation program or tool loads and merges any sub-configuration file(s) into memory. Moreover, in step 606, the audit and security compliance validation program or tool merges and/or overwrites the sub-configuration file(s) into a master configuration file. Further, in step 608, the audit and security compliance validation program or tool parses the combined configuration file(s) and begins evaluation of the settings on the target system in step 610, ending the process. Turning to FIG. 7, reference numeral 700, outlines the steps performed by the audit and security compliance validation program or tool when parsing the one or more configuration file(s) for processing operating modes, execution rules or runtime profiles created, operating environments and/or server platforms contained within the one or more configuration file(s) for running inventory checks on a target system. In step 702, the audit and security compliance validation program or tool determines the inventory plug-in(s) to be executed on a target system. In particular, the target system verifies in step 704, that the configuration file and the audit and security compliance validation program or tool matches minimum requirements required by each other to assure proper operation of the audit and security compliance validation performed on the target system. Further, in step 706, the audit and security compliance validation program or tool creates, in one or more configuration files, operating modes for execution of the inventory plug-in(s) based on a current date and/or time, which are then applied during execution of the inventory plug-in(s). In step 708, the audit and security compliance validation program or tool determines, using a heuristics program contained within the audit and security compliance validation program or tool, a type of operating environment that the target system comprises. In an embodiment, the heuristics program within the audit and security compliance validation program or tool applies operating environment filters or criteria for determining the type of operating environment that a target system operates in, such as, a test environment, a development environment, a production environment, a laboratory environment, and/or a quality and assurance environment. For instance, the heuristics program may determine the type of operating environments that a target system is operated in by using a system naming convention or by utilizing a pattern matching convention that may include one or more characteristics, such as, hostname, IP address, product instance, network segment, database naming conventions, etc. Further, in step 710, the audit and security compliance validation program or tool determines or specifies a current platform for execution of the inventory plug-in(s) selected for execution. In an embodiment, the audit and security compliance validation program or tool checks the type of operating system run on a target system in order to execute the inventory plug-in(s) on the target system. Further, in step 712, the audit and security compliance validation program or tool loads user-defined error-severity levels for handling failures that may occur during execution of plug-in(s). The audit and security compliance validation program or tool loads a list of inventory and health-check plug-in(s) from the configuration file in step 714. Further, for each plug-in listed in the list in step 714, the audit and security validation program or tool determines in step 718 whether or not the execution requirements match the necessary operating mode, operating environment, and/or server platform. In step 720, the audit and security compliance validation program or tool shows or displays the list of preliminary plug-in(s) that are applicable to a first pass of the execution cycle, that is, the plug-in(s) are executed only if qualified applications or software is actually installed on the target system, ending the process.

Figure 8:
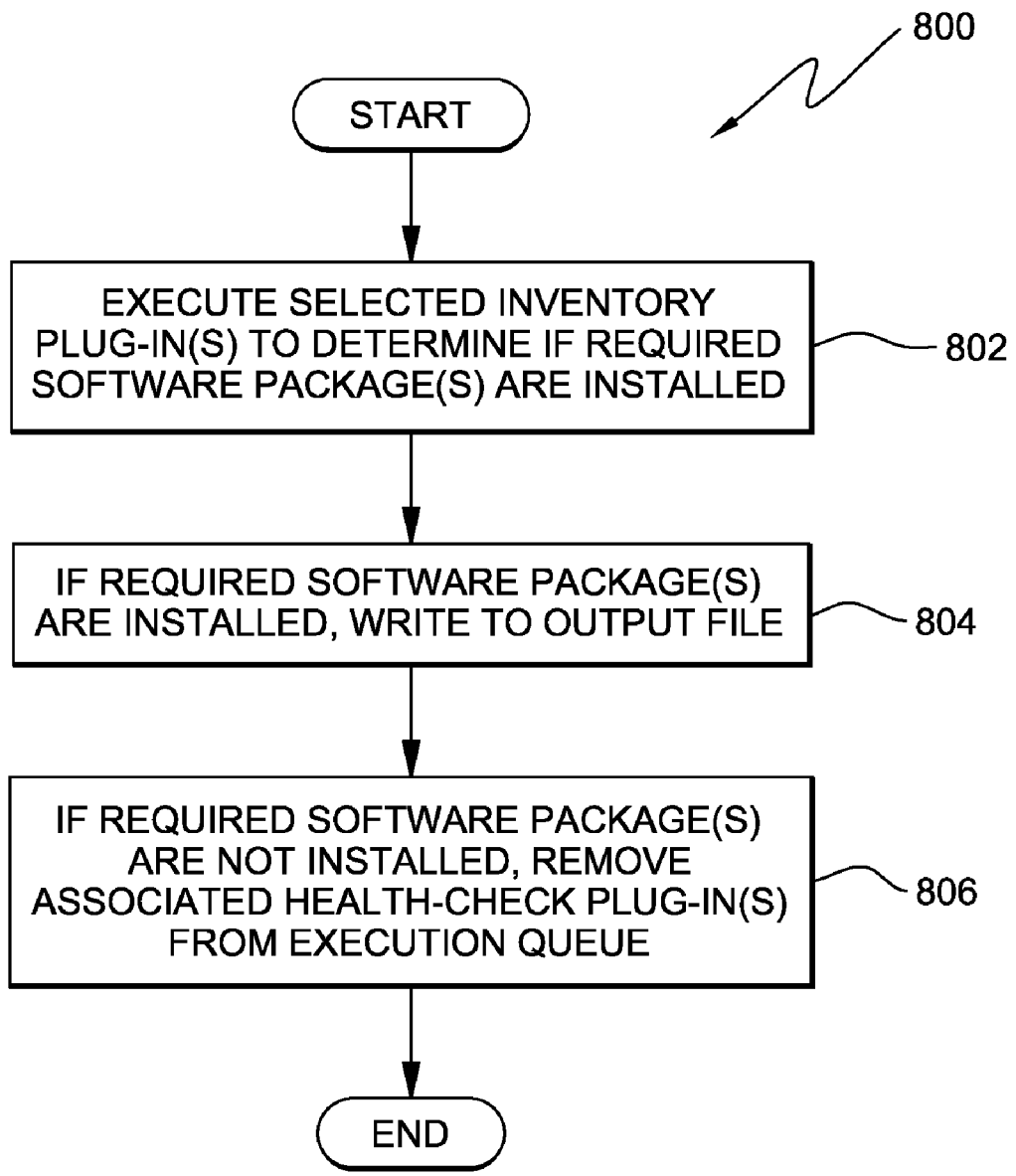
FIG. 8 depicts a flowchart outlining one embodiment of the steps performed by an audit and security compliance validation tool for dynamically performing an audit and security compliance validation on a target system, in accordance with an embodiment of the present invention.

Reference is now made to FIG. 8, reference numeral 800, which depicts a flowchart outlining an embodiment of the steps performed by an audit and security compliance validation tool for dynamically performing an audit and security compliance validation, in accordance with an embodiment of the present invention. In particular, FIG. 8 outlines the steps performed by the audit and security compliance validation program or tool in step 506 of FIG. 5. Turning to FIG. 8, reference numeral 800, outlines the steps performed by the audit and security compliance validation program or tool of executing one or more selected inventory plug-in(s) to query for software applications or products currently installed on the target system. In step 802, the audit and security compliance validation program or tool executes the inventory plug-in(s) that are selected to determine if the required software packages or applications are installed on the target system. In step 804, if the required software packages are determined by the audit and security compliance validation program or tool to be installed on the target system, then the audit and security compliance validation program or tool writes and stores the inventory results to an output file. In an embodiment, the output file is a machine readable file, such as, an XML data file. However, if the required software packages are determined by the audit and security compliance validation program or tool to be not installed on the target system, then the audit and security compliance validation program or tool removes the associated health-check plug-in(s) from the execution queue in step 806, ending the process.

Figure 9:
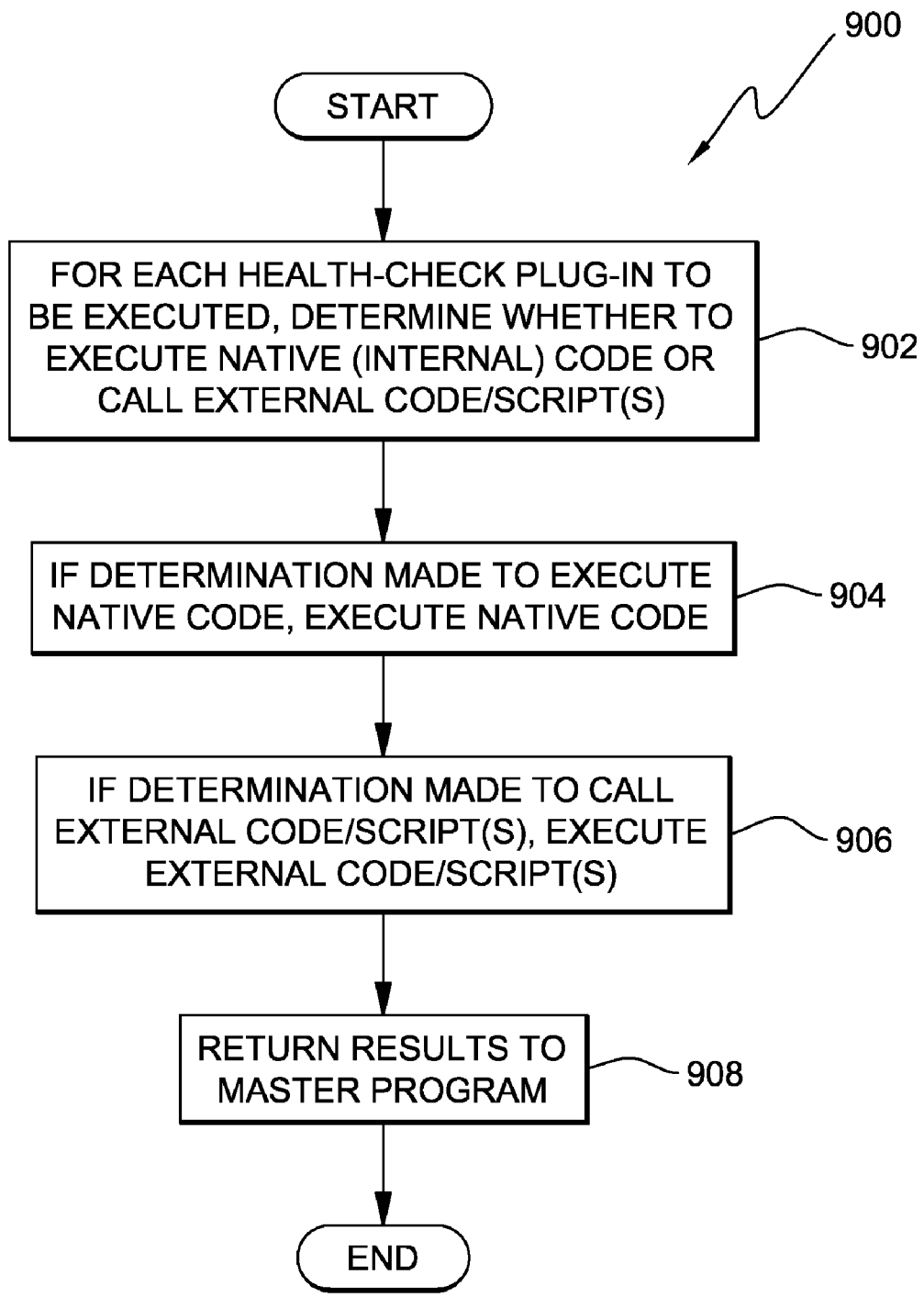
FIG. 9 depicts a flowchart outlining one embodiment of the steps performed by an audit and security compliance validation tool for dynamically performing an audit and security compliance validation on a target system, in accordance with an embodiment of the present invention.

Reference is now made to FIG. 9, reference numeral 900, which depicts a flowchart outlining an embodiment of the steps performed by an audit and security compliance validation tool for dynamically performing an audit and security compliance validation, in accordance with an embodiment of the present invention. In particular, FIG. 9 outlines the steps performed by the audit and security compliance validation program or tool in step 508 of FIG. 5. Turning to FIG. 9, reference numeral 900, outlines the steps performed by the audit and security compliance validation program or tool of executing one or more selected health-check plug-in(s) to perform an audit and security compliance validation of the target system based on the current inventory performed on the target system. In step 902, the audit and security compliance validation program or tool executes each of the health-check plug-in(s) that are selected based on the current inventory results of the target system. In an embodiment, the audit and security compliance validation program or tool determines whether or not to execute native code, that is, code internal to the audit and security compliance validation tool or to call one or more code or script(s) external to the audit and security compliance validation tool itself, thus, allowing for an extensible framework that can perform the audit and security validation for a target system. In step 904, if the audit and security compliance validation program or tool makes a determination to execute native code, then the audit and security compliance validation program or tool executes the native code determined. However, if the audit and security compliance validation program or tool makes a determination to execute external code or script(s), then the audit and security compliance validation program or tool makes a call to execute external code or script(s) in step 906. Further, results of the execution of the health-check plug-in(s) are returned to the audit and security compliance validation program or tool or master program in step 908, ending the process.

Figure 10:
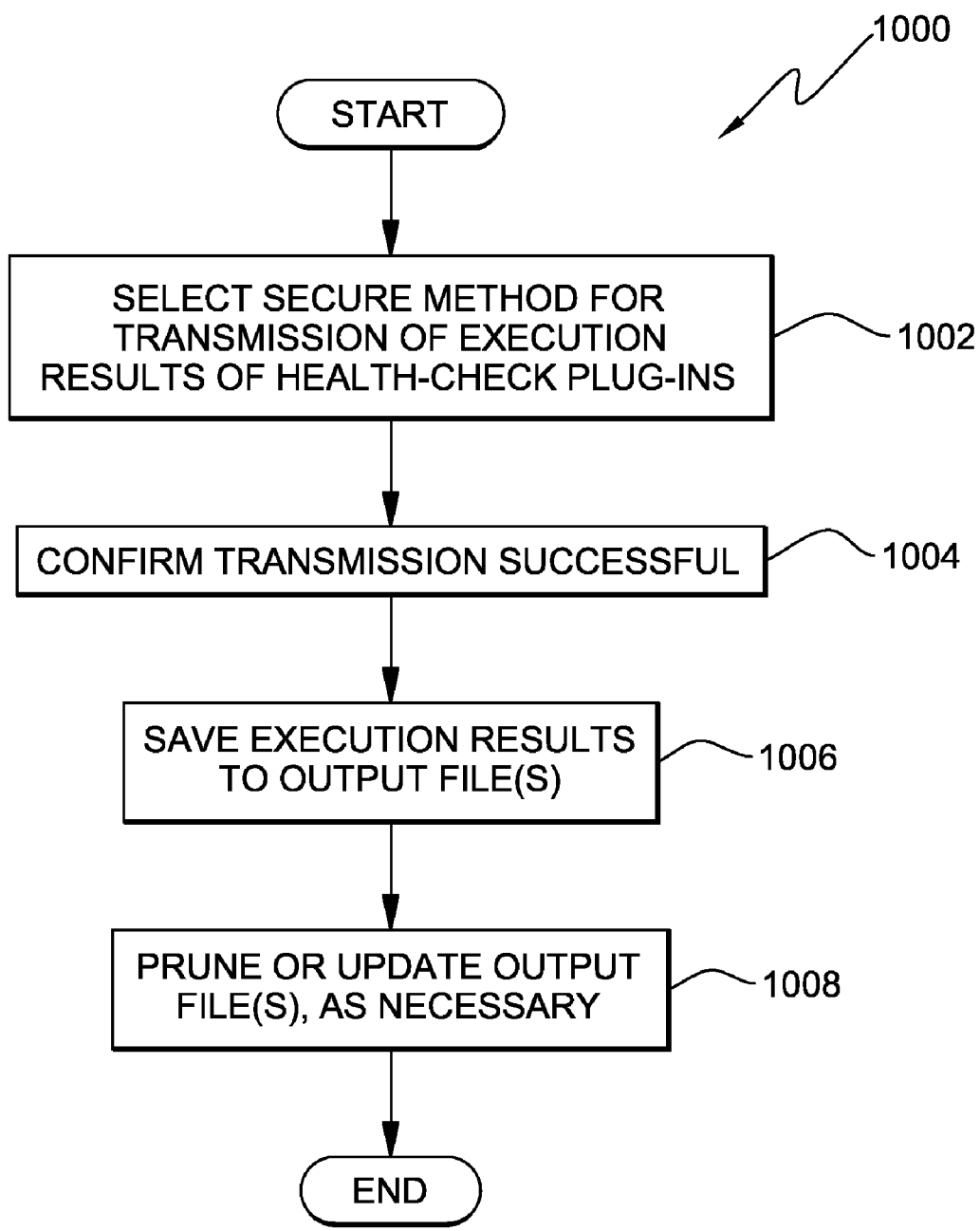
FIG. 10 depicts a flowchart outlining one embodiment of the steps performed by an audit and security compliance validation tool for dynamically performing an audit and security compliance validation on a target system, in accordance with an embodiment of the present invention.

Reference is now made to FIG. 10, reference numeral 1000, which depicts a flowchart outlining an embodiment of the steps performed by an audit and security compliance validation tool for dynamically performing an audit and security compliance validation, in accordance with an embodiment of the present invention. In particular, FIG. 10 outlines the steps performed by the audit and security compliance validation program or tool in step 510 of FIG. 5. Turning to FIG. 10, reference numeral 1000, outlines the steps performed by the audit and security compliance validation program or tool for transmitting the results of the execution of the one or more health-check plug-in(s) performed on the target system to a repository or database associated with the central repository server. In step 1002, the audit and security compliance validation tool selects a secure method for the transmission of the execution results of the health-check plug-in(s) on the target system to a repository or database associated with the central repository server. For instance, the audit and security compliance validation tool may transmit the results using encrypted e-mail or any other encryption methods or may transport the results using a secure network protocol, such as, the SSH (Secure Shell) protocol that allows data to be exchanged using a secure channel between two networked devices. In step 1004, the audit and security compliance validation program or tool checks to confirm that the transmission is successful. Further, in step 1006, the audit and security compliance validation program or tool writes to and/or stores the execution results of the health-check plug-in(s) to one or more output file. In an embodiment, the output file is a machine readable file, such as, an XML data file. In an embodiment, any errors resulting from the execution of the health-check plug-in(s) are sent to a log file. Further, the audit and security compliance validation program or tool prunes or updates in step 1008 the execution results written to the output files, ending the process.

Figure 11:
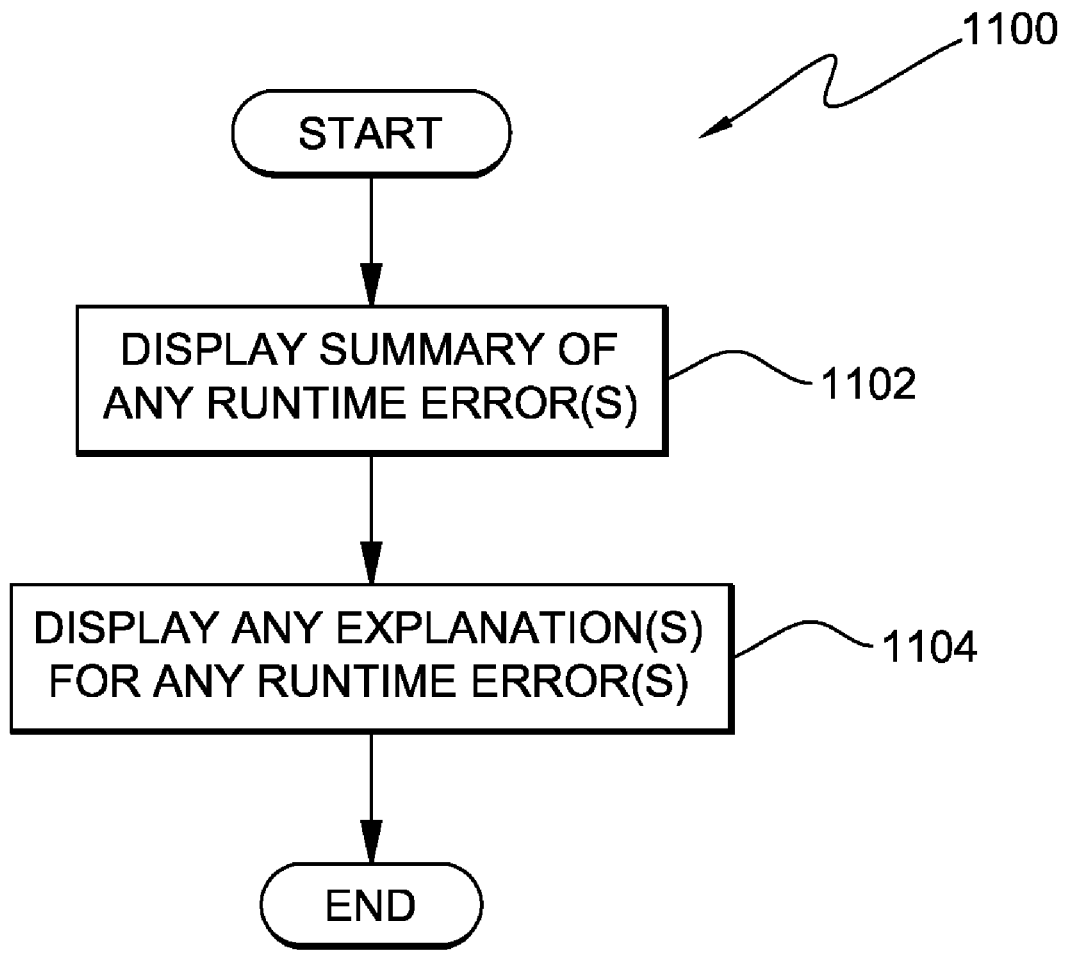
FIG. 11 depicts a flowchart outlining one embodiment of the steps performed by an audit and security compliance validation tool for dynamically performing an audit and security compliance validation on a target system, in accordance with an embodiment of the present invention.

Reference is now made to FIG. 11, reference numeral 1100, which depicts a flowchart outlining an embodiment of the steps performed by an audit and security compliance validation tool for dynamically performing an audit and security compliance validation, in accordance with an embodiment of the present invention. In particular, FIG. 11 outlines the steps performed by the audit and security compliance validation program or tool in step 512 of FIG. 5. Turning to FIG. 11, reference numeral 1100, outlines the steps performed by the audit and security compliance validation program or tool in displaying a summary of the execution results of the one or more selected health-check plug-in(s) to perform the audit and security compliance validation of the target system. In step 1102, the audit and security compliance validation program or tool displays a summary of any runtime error(s) found. Further, in step 1104, the audit and security compliance validation program or tool displays any explanations associated with any of the runtime errors found in step 1102, ending the process. In an embodiment, the steps 1102 and 1104 may be performed such that the summary information and/or explanation(s) associated with any runtime errors may be passed back to a central console or dashboard, such that, users can be notified or runtime error(s) and/or explanations without having to interact with or access a specific target system.

Accordingly, the invention provides a system that includes a computer program, namely, the audit and security compliance validation program or tool that performs the method or process steps of performing an audit and security compliance validation of a computer system. With the audit and security compliance validation program or tool, multiple configuration file(s) can be created and stored on a target system, where the configuration file(s) contain all the information or data necessary for each system to determine what plug-in(s) need to be run at any given time, based on multiple criteria, such as, operating mode or execution profiles or rules, operating environment, platform type and required software. Given that a configuration file can be created to include different runtime profiles or execution rules, the different plug-in(s) can be automatically executed depending on which execution profiles or rules are applicable to a computer system. Further, through the creation of operating modes, the invention provides the ability to establish processing intervals, which can be used to correlate the execution of specific plug-in(s) at a given point-in-time. Furthermore, by establishing operating environment criteria or filters in the heuristics program contained within the audit and security compliance validation program or tool, a system is able to dynamically self-diagnose applicable operating environments and the specific plug-in(s) that should be executed in those operating environments. Moreover, the establishment of the platform on which a system is executing can be used to further correlate specific plug-in(s) that are to be executed. Thus, each of the above criteria can be used to create a point-in-time list of plug-in(s) that are suitable for execution on a system. This list can be revised based on ongoing discovery of qualified products installed on the system. Further, the audit and security compliance validation program ensures that plug-in(s) are not executed unnecessarily, that is, if the software is not installed on the system. In particular, the preliminary plug-in(s) list provides a list of inventory plug-in(s) that should be executed first. The results of the execution of the inventory plug-in(s) are then transmitted to the health-check plug-in(s) list to re-evaluate and remove any health-check plug-in(s) from the list when requirements are not met. Further, the inventory plug-in(s) write to an output file a list of install software applications as they execute on the system. This information is used by the audit and security compliance validation program or tool to only execute the health-check plug-in(s) for software that is installed on the system. The health-check plug-ins are executed sequentially and the results are securely transmitted to the central repository server. As such, results of the audit and security compliance validation checks can be transmitted over a secure network directly or indirectly (via a middle layer of systems) to a central repository. Further, results can be summarized on a screen to a user and any errors can also be stored in a log file.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for dynamically performing an audit and security compliance validation, said method comprising the steps of:

providing a tool for performing an audit and security compliance validation of one or more installed computer applications running on a computer system in an operating environment, said tool including a first set of plug-ins and a second set of plug-ins;

scanning said computer system, using one or more plug-ins from said first set of plug-ins of said tool, to obtain a current inventory of computer applications currently installed on said computer system in said operating environment;

selecting one or more plug-ins from said second set of plug-ins of said tool to be run on said computer system in response to said current inventory of said computer applications obtained for said computer system in said operating environment; and automatically running said one or more plug-ins selected from said second set of plug-ins of said tool for performing said audit and security compliance validation on said computer system in response to a scheduling criteria identified for said computer system, wherein said one or more plug-ins selected from said second set of plug-ins perform said audit and security compliance validation for only said computer applications currently installed on said computer system in said operating environment and wherein said operating environment comprises at least one of: a development environment, a test environment, a quality and assurance environment, a production environment and a laboratory environment.

2. A method according to claim 1, further comprising the step of:

securely transmitting, to a repository, results of said audit and security compliance validation performed on said computer system in said operating environment.

3. A method according to claim 1, wherein said scanning step further comprises the step of:

identifying one or more scheduling criteria for triggering automatic performance of said tool on said computer system in said operating environment, wherein said one or more scheduling criteria comprises at least one of: operating mode, operating environment and server platform.

4. A method according to claim 3, wherein said identifying step further comprises the steps of:

configuring, in a configuration file, said one or more scheduling criteria for triggering said automatic performance of said tool on said computer system, wherein occurrence of said one or more scheduling criteria triggers said automatic performance of said one or more plug-ins selected from said first set of plug-ins and said second set of plug-ins on said computer system.

5. A method according to claim 4, wherein said selecting step further comprises the step of:
reading, by said tool, said configuration file for determining said one or more plug-ins from said second set of plug-ins to be run on said computer system in said operating environment.

6. A method according to claim 5, wherein said securely transmitting step further comprises the step of:
writing said results of said audit and security compliance validation performed to one or more machine readable report files stored in said repository.

7. A computer system for dynamically performing an audit and security compliance validation, said computer system comprising:
first program instructions to scan a computer system, using a first set of plug-ins of a tool, to obtain a current inventory of computer applications currently installed on said computer system in an operating environment;
second program instructions to select, in response to said current inventory of said computer applications obtained from said computer system, one or more plug-ins from a second set of plug-ins of said tool; and
third program instructions to automatically run said one or more plug-ins from said second set of plug-ins of said tool for performing said audit and security compliance validation on said computer system in response to a scheduling criteria identified for said computer system in said operating environment, wherein said one or more plug-ins selected from said second set of plug-ins perform said audit and security compliance validation for said computer system in said operating environment only if said computer application is currently installed on said computer system, wherein said operating environment comprises at least one of: a development environment, a test environment, a quality and assurance environment, a production environment and a laboratory environment;
a computer readable storage medium, said computer readable storage medium storing each of said first, second and third program instructions; and
a central processing unit for executing each of said first, second and third program instructions.

8. A computer system according to claim 7, further comprising:
fourth program instructions to securely transmit, to a repository, results of said audit and security compliance validation performed on said computer system in said environment, and wherein said fourth program instructions are stored on said computer readable storage medium for execution by said central processing unit.

9. The computer system according to claim 8, wherein said first program instructions include instructions to identify one or more scheduling criteria for automating performance of said tool on said computer system in said environment, wherein said one or more scheduling criteria comprises at least one of: operating mode, operating environment and server platform.

10. The computer system according to claim 9, wherein said first program instructions include instructions to configure, in a configuration file, said one or more scheduling criteria for triggering said automatic performance of said tool on said computer system, wherein occurrence of said one or more scheduling criteria triggers said automatic performance of said one or more plug-ins selected from said first set of plug-ins and said second set of plug-ins on said computer system.

11. The computer system according to claim 10, wherein said second program instructions include instructions to read, by said tool, said configuration file for determining said one or more plug-ins from said second set of plug-ins to be run on said computer system in said operating environment.

12. The computer system according to claim 11, wherein said fourth program instructions include instructions to write said results of said audit and security compliance validation performed to one or more machine readable report files stored in said repository.

13. A computer program product for dynamically performing an audit and security compliance validation, said computer program product comprising:
a computer-readable tangible storage device;
first program instructions to scan a computer system, using one or more plug-ins from a first set of plug-ins of a tool, to obtain a current inventory of computer applications currently installed on said computer system;
second program instructions to select, in response to said current inventory of said computer applications obtained from said computer system, one or more plug-ins from a second set of plug-ins of said tool; and
third program instructions to automatically run said one or more plug-ins from said second set of plug-ins of said tool for performing said audit and security compliance validation on said computer system in response to a scheduling criteria identified for said computer system, wherein said one or more plug-ins selected from said second set of plug-ins perform said audit and security compliance validation for only said computer applications currently installed on said computer system, and wherein said first, second and third program instructions are stored on said computer-readable tangible storage device.

14. The computer program product according to claim 13, further comprising:
fourth program instructions to securely transmit, to a repository, results of said audit and security compliance validation performed on said computer system in said environment, and wherein said fourth program instructions are stored on said computer-readable tangible storage device.

15. The computer program product according to claim 13, wherein said first program instructions include instructions to identify one or more scheduling criteria for automating performance of said tool on said computer system in said environment, and wherein said one or more scheduling criteria comprises at least one of: operating mode, operating environment and server platform, wherein said operating environment comprises at least one of: a development environment, a test environment, a quality and assurance environment, a production environment and a laboratory environment.

16. The computer program product according to claim 15, wherein said first program instructions include instructions to configure, in a configuration file, said one or more scheduling criteria for triggering said automatic performance of said tool on said computer system, wherein occurrence of said one or more scheduling criteria triggers said automatic performance of said one or more plug-ins selected from said first set of plug-ins and said second set of plug-ins on said computer system.

17. The computer program product according to claim 16, wherein said second program instructions include instructions to read, by said tool, said configuration file for determining said one or more plug-ins from said second set of plug-ins to be run on said computer system in said operating environment.

18. The computer program product according to claim 17, wherein said fourth program instructions include instructions to write said results of said audit and security compliance validation performed to one or more machine readable report files stored in said repository.

19. A process for deploying computing infrastructure comprising integrating computer-readable code into a computing system, wherein said code in combination with said computing system is capable of dynamically performing an audit and security compliance validation, said process comprising:

provhttps://ing a tool for performing an audit and security compliance validation of one or more installed computer applications running on a computer system in an operating environment, said tool including a first set of plug-ins and a second set of plug-ins;

identifying one or more scheduling criteria for triggering automatic performance of said tool on said computer system in said operating environment;

scanning said computer system, using one or more plug-ins from said first set of plug-ins of said tool, to obtain a current inventory of computer applications currently installed on said computer system in said operating environment;

selecting one or more plug-ins from said second set of plug-ins of said tool to be run on said computer system in response to said current inventory of said computer applications obtained for said computer system in said operating environment; and automatically running said one or more plug-ins selected from said second set of plug-ins of said tool for performing said audit and security compliance validation on said computer system in response to a scheduling criteria identified for said computer system, wherein said one or more plug-ins selected from said second set of plug-ins perform said audit and security compliance validation for only said computer applications currently installed on said computer system in said operating environment.

20. The process according to claim 19, further comprising the step of:

securely transmitting, to a repository, results of said audit and security compliance validation performed on said computer system in said operating environment.

21. The process according to claim 19, wherein said identifying step further comprises the steps of:

configuring, in a configuration file, said one or more scheduling criteria for triggering said automatic performance of said tool on said computer system, wherein occurrence of said one or more scheduling criteria triggers said automatic performance of said one or more plug-ins selected from said first set of plug-ins and said second set of plug-ins on said computer system.

22. The process according to claim 21, wherein said selecting step further comprises the step of:

reading, by said tool, said configuration file for determining said one or more plug-ins from said second set of plug-ins to be run on said computer system in said operating environment.

23. The process according to claim 22, wherein said securely transmitting step further comprises the step of:

writing said results of said audit and security compliance validation performed to one or more machine readable report files stored in said repository.

24. The process according to claim 23, wherein said one or more scheduling criteria comprises at least one of: operating mode, operating environment and server platform.

25. The process according to claim 24, wherein said operating environment comprises at least one of: a development environment, a test environment, a quality and assurance environment, a production environment and a laboratory environment.

* * * * *